US011564775B2

(12) United States Patent
Lockhart et al.

(10) Patent No.: US 11,564,775 B2
(45) Date of Patent: Jan. 31, 2023

(54) SYSTEMS AND METHODS FOR TRACKING DENTAL ALIGNER PRODUCTION AND MANUFACTURE

(71) Applicants: Bryan Allen Lockhart, Charlotte, NC (US); Lauren Rennick Lockhart, Charlotte, NC (US)

(72) Inventors: Bryan Allen Lockhart, Charlotte, NC (US); Lauren Rennick Lockhart, Charlotte, NC (US)

( * ) Notice: Subject to any disclaimer, the term of this patent is extended or adjusted under 35 U.S.C. 154(b) by 189 days.

(21) Appl. No.: 17/039,562

(22) Filed: Sep. 30, 2020

(65) Prior Publication Data

US 2022/0096206 A1    Mar. 31, 2022

(51) Int. Cl.
*B33Y 50/02* (2015.01)
*A61C 7/00* (2006.01)
*B33Y 10/00* (2015.01)
*B33Y 30/00* (2015.01)
*B33Y 80/00* (2015.01)
*G06F 3/048* (2013.01)
*A61C 7/08* (2006.01)

(52) U.S. Cl.
CPC .............. *A61C 7/002* (2013.01); *B33Y 10/00* (2014.12); *B33Y 30/00* (2014.12); *B33Y 50/02* (2014.12); *B33Y 80/00* (2014.12); *G06F 3/048* (2013.01); *A61C 7/08* (2013.01)

(58) Field of Classification Search
CPC ...................................................... B33Y 50/02
See application file for complete search history.

(56) References Cited

U.S. PATENT DOCUMENTS

| 2018/0368954 A1* | 12/2018 | Katzman | A61C 9/0006 |
| 2021/0158607 A1* | 5/2021 | Katzman | G06T 7/50 |
| 2021/0298874 A1* | 9/2021 | Katzman | G16H 15/00 |
| 2021/0353386 A1* | 11/2021 | Raby | A61C 7/10 |

* cited by examiner

*Primary Examiner* — Suresh Suryawanshi
(74) *Attorney, Agent, or Firm* — Carr & Ferrell LLP

(57) ABSTRACT

Systems and methods for tracking dental aligner production and manufacture for a plurality of patients are disclosed herein. Exemplary methods include displaying a graphical user interface for the tracking dental aligner production and manufacture for the plurality of patients comprising: a first row of cells containing a first subject heading displaying a scan status, the scan status being a status of the receiving the intra-oral scan; a second row of cells containing a second subject heading displaying a treatment plan status, the treatment plan status being a status of the receiving a treatment plan including the desired teeth positions of the patient based on the intra-oral scan; and a third row of cells containing a third subject heading displaying a printing status, the printing status being a status of the printing, using a three-dimensional (3D) printer, the series of dental models matching the series of modified teeth positions.

21 Claims, 16 Drawing Sheets

| | | | | | | | | | | | |
|---|---|---|---|---|---|---|---|---|---|---|---|
| CP DUALINE | | | | | | | | | | | |
| Demo | Dashboard | | | | | | | | | | |
| Dashboard | 300 | | | | | | | | | | ← → Calender View |
| Ready For Loading | 44 | Ready for Loading | | | | | | | | | Search: |
| Dr Review | 11 | | | | | | | | | | |
| Needs Printing | 28 | Show 10 entries | | | | | | | | | |
| Needs Thermoform | 1 | ↕ Date | ↕ Patient Location | ↕ First Name | ↕ Last Name | ↕ Treatment Type | ↕ Scan By | ↕ Scan Date | ↕ Software Name | ↕ Current Status | ↕ Next Status | ↕ Due Date | Actions |
| Needs Trim and Polish | 0 | May/13/2020 | DIDO | Quinton | XXXXX | Spacing | Maria Paz | May/13/2020 | uLAB | Ready for Loading | Dr Review | Jun/15/2020 | ←→ X |
| Needs Packaging | 0 | May/13/2020 | DIO | Afton | XXXXX | Crowding | Karen Cubas | May/13/2020 | uLAB | Ready for Loading | Dr Review | No Set Yet | ←→ X |
| Case Ready | 3 | May/13/2020 | DIO | Treaunda | XXXXX | Crowding | Maria Paz | May/13/2020 | uLAB | Ready for Loading | Dr Review | No Set Yet | ←→ X |
| Case Completed | 29 | May/13/2020 | DIO | Milton | XXXXX | Crowding | Karen Cubas | May/13/2020 | uLAB | Ready for Loading | Dr Review | No Set Yet | ←→ X |
| Due Soon | 12 | May/13/2020 | DIO | Lakiesha | XXXXX | Open Bite | Maria Paz | May/13/2020 | uLAB | Ready for Loading | Dr Review | No Set Yet | ←→ X |
| | | May/17/2020 | DIO | Khadijia | XXXXX | Class 11 | Karen Cubas | May/17/2020 | uLAB | Ready for Loading | Dr Review | Oct/01/2020 | ←→ X |
| | | May/17/2020 | DIO | Jana | XXXXX | Crowding | Maria Paz | May/17/2020 | uLAB | Ready for Loading | Dr Review | No Set Yet | ←→ X |
| | | May/17/2020 | DIO | Tania | XXXXX | Crowding | Karen Cubas | May/17/2020 | uLAB | Ready for Loading | Dr Review | No Set Yet | ←→ X |
| | | May/17/2020 | DIO | Elizabeth | XXXXX | Crowding | Karen Cubas | May/17/2020 | uLAB | Ready for Loading | Dr Review | No Set Yet | ←→ X |
| | | May/17/2020 | DIO | Nicole | XXXXX | Crowding | Amanda Taboada | May/17/2020 | uLAB | Ready for Loading | Dr Review | No Set Yet | ←→ X |
| | | | | | | | | | | FIRST PREV ①2 3 4 5 NEXT LAST | |

FIG. 3

| | | | | | | | | | | |
|---|---|---|---|---|---|---|---|---|---|---|
| CP DUALINE | | | | | | | | | | |
| ⊕ Demo | | | ⊕ Dashboard | | | | | | | |
| ■■ Dashboard | | | 400 | | | | | | → Calender View | |
| ⊕ Ready For Loading [44] | | | ▭ Dr Review | | | | | | Search: ▭ | |
| ▽ Dr Review [11] | | | Show 10 entries | | | | | | | |
| 🖨 Needs Printing [28] | ↕ Date | Patient Location | First Name | Last Name | Treatment Type | Scan By | Scan Date | Software Name | Current Status | Next Status | Due Date | Actions |
| ⚐ Needs Thermoform [1] | May/13/2020 | DIDO | Amanda | XXXXX | Crowding | Maria Paz | May/13/2020 | uLAB | Dr Review | Need Printing | Sep/24/2020 | ← ↑ ↓ ✕ |
| 🗐 Needs Trim and Polish [0] | May/17/2020 | DiO | Rachel | XXXXX | Crowding | Karen Cubas | May/17/2020 | uLAB | Dr Review | Need Printing | Not Set Yet | ← ↑ ↓ ✕ |
| ⊗ Needs Packaging [0] | May/17/2020 | DiO | Colen | XXXXX | Crowding | Stephanie Padilla | May/17/2020 | uLAB | Dr Review | Need Printing | Not Set Yet | ← ↑ ↓ ✕ |
| ✣ Case Ready [3] | May/17/2020 | DIDO | Ashley | XXXXX | Class II | Maria Paz | May/17/2020 | uLAB | Dr Review | Need Printing | Sep/24/2020 | ← ↑ ↓ ✕ |
| ⊙ Case Completed [29] | May/17/2020 | DiO | Nneka | XXXXX | Crowding | Maria Paz | May/17/2020 | uLAB | Dr Review | Need Printing | Not Set Yet | ← ↑ ↓ ✕ |
| ⊙ Due Soon [12] | May/17/2020 | DiO | Regina | XXXXX | Crowding | Stephanie Padilla | May/17/2020 | uLAB | Dr Review | Need Printing | Not Set Yet | ← ↑ ↓ ✕ |
| | May/17/2020 | DiO | Nikki | XXXXX | Extraction | Stephanie Padilla | May/17/2020 | uLAB | Dr Review | Need Printing | Not Set Yet | ← ↑ ↓ ✕ |
| | May/17/2020 | DIDO | Shanelle | XXXXX | Spacing | Maria Paz | May/17/2020 | uLAB | Dr Review | Need Printing | Sep/18/2020 | ← ↑ ↓ ✕ |
| | Jun/15/2020 | DiO | La'Teresa | XXXXX | Spacing | Maria Paz | Jun/12/2020 | uLAB | Dr Review | Need Printing | Not Set Yet | ← ↑ ↓ ✕ |
| | Sep/08/2020 | DiO | Pedro | XXXXX | Spacing | Maria Paz | Sep/08/2020 | uLAB | Dr Review | Need Printing | Sep/22/2020 | ← ↑ ↓ ✕ |
| | | | | | | | | | FIRST PREV (1) 2 NEXT LAST | |

FIG. 4

| | | | | | | | | | | | |
|---|---|---|---|---|---|---|---|---|---|---|---|
| CP DUALINE | | | | | | | | | | | |
| ⊙ Demo | ⊙ Dashboard | | | | | | | | | | |
| ■■ Dashboard | | | | | | | | Search: | | ← → Calender View | |
| ⊙ Ready For Loading [44] | | | | | | | | | | | |
| ☑ Dr Review [11] | 🖶 Needs Printing | | | | | | | | | | |
| 🖨 Needs Printing [28] | Show 10 entries | | | | | | | | | | |
| ⋀ Needs Thermoform [1] | Date ⇅ | Patient Location ⇅ | First Name ⇅ | Last Name ⇅ | Treatment Type ⇅ | Scan By ⇅ | Scan Date ⇅ | Software Name ⇅ | Current Status ⇅ | Next Status ⇅ | Due Date ⇅ Actions |
| 📄 Needs Trim and Polish [0] | ☐ May/04/2020 | DIO | Melanie | XXXXX | Spacing | Maria Paz | May/04/2020 | uLAB | Need Printing | Needs Thermoform | Jul/29/2020 ← → ✕ |
| ⊕ Needs Packaging [0] | ☐ May/13/2020 | DIO | Ebony | XXXXX | Deep Bite | Maria Paz | May/13/2020 | uLAB | Need Printing | Needs Thermoform | Aug/10/2020 ← → ✕ |
| ✣ Case Ready [3] | ☐ May/17/2020 | DIO | Laurette | XXXXX | Spacing | Maria Paz | May/17/2020 | uLAB | Need Printing | Needs Thermoform | Jul/17/2020 ← → ✕ |
| ⊙ Case Completed [29] | ☐ May/17/2020 | DIDO | Keshia | XXXXX | Spacing | Maria Paz | May/17/2020 | uLAB | Need Printing | Needs Thermoform | Jul/09/2020 ← → ✕ |
| ⟲ Due Soon [12] | ☐ May/17/2020 | DIO | Chinet | XXXXX | Class II | Maria Paz | May/17/2020 | uLAB | Need Printing | Needs Thermoform | Sep/02/2020 ← → ✕ |
| | ☐ May/17/2020 | DIO | Jorge | XXXXX | Crowding | Stephanie Padilla | May/17/2020 | uLAB | Need Printing | Needs Thermoform | Sep/21/2020 ← → ✕ |
| | ☐ May/17/2020 | DIO | Nancy | XXXXX | Crowding | Amanda Taboada | May/17/2020 | uLAB | Need Printing | Needs Thermoform | Jun/12/2020 ← → ✕ |
| | ☐ May/17/2020 | DIO | Robert | XXXXX | Crowding | Stephanie Padilla | May/17/2020 | uLAB | Need Printing | Needs Thermoform | Not Set Yet ← → ✕ |
| | ☐ May/17/2020 | DIO | Brianna | XXXXX | Crowding | Amanda Taboada | May/17/2020 | uLAB | Need Printing | Needs Thermoform | Sep/14/2020 ← → ✕ |
| | ☐ May/17/2020 | DIO | Sayra | XXXXX | Crowding | Amanda Taboada | May/17/2020 | uLAB | Need Printing | Needs Thermoform | Not Set Yet ← → ✕ |
| | FIRST PREV ① 2 3 NEXT LAST | | | | | | | | | | |

| | Patient Location | First Name | Last Name | Treatment Type | Scan By | Scan Date | Software Name | Current Status | Next Status | Due Date | Actions |
|---|---|---|---|---|---|---|---|---|---|---|---|
| ☐ May/13/2020 | DIDO | Sincere | XXXXX | Spacing | Maria Paz | May/13/2020 | uLAB | Case Ready | Case Completed | Jul/11/2020 | ← → ✕ |
| ☐ May/13/2020 | DIO | Brittny | XXXXX | Crowding | Maria Paz | May/13/2020 | uLAB | Case Ready | Case Completed | Jul/28/2020 | ← → ✕ |
| ☐ May/20/2020 | DIO | Ashley | XXXXX | Spacing | Maria Paz | May/20/2020 | uLAB | Case Ready | Case Completed | Jul/10/2020 | ← → ✕ |

CP DUALINE
- Demo
- Dashboard
  - Ready For Loading [44]
  - Dr Review [11]
  - Needs Printing [28]
  - Needs Thermoform [1]
  - Needs Trim and Polish [0]
  - Needs Packaging [0]
  - Case Ready [3]
  - Case Completed [29]
  - Due Soon [11]

Dashboard — Case Ready — Show 10 entries — Search: — Calender View

FIRST PREV (1) NEXT LAST

900

| CP DUALINE | ⊙ Dashboard | | | | | | | | | |
|---|---|---|---|---|---|---|---|---|---|---|
| ⓐ Demo | | | | | | | | ← → Calender View | | |
| ▤▤ Dashboard | | | | | | | | | | |
| ⊙ Ready For Loading [44] | ▦ Case Completed | | | | | | | Search: | | |
| ☑ Dr Review [11] | Show 10 entries | | | | | | | | | |
| 🖶 Needs Printing [28] | ☐ ↕ Date | Patient ↕ Location | First ↕ Name | Last ↕ Name | Treatment ↕ Type | Scan ↕ By | Scan ↕ Date | Software ↕ Name | Current ↕ Status | Next Status | Due Date | Actions |
| ⚙ Needs Thermoform [1] | ☐ May/17/2020 | DIO | Jaqueline | XXXXX | Crowding | Amanda Taboada | May/17/2020 | uLAB | Case Completed | Not Set Yet | Not Set Yet | × |
| ✂ Needs Trim and Polish [0] | ☐ May/17/2020 | DIO | Reggie | XXXXX | Class III | Stephanie Padilla | May/17/2020 | uLAB | Case Completed | Not Set Yet | Not Set Yet | ↔ × |
| 📦 Needs Packaging [0] | ☐ May/17/2020 | DIO | Dibania | XXXXX | Spacing | Karen Cubas | May/17/2020 | uLAB | Case Completed | Not Set Yet | Not Set Yet | ↔ × |
| ✿ Case Ready [3] | ☐ May/17/2020 | DIDO | Julia | XXXXX | Class II | Maria Paz | May/17/2020 | uLAB | Case Completed | Not Set Yet | Not Set Yet | ↔ × |
| ⏲ Case Completed [29] | ☐ May/17/2020 | DIO | Meghan | XXXXX | Crowding | Karen Cubas | May/17/2020 | uLAB | Case Completed | Not Set Yet | Not Set Yet | ↔ × |
| ⏱ Due Soon [12] | ☐ May/17/2020 | DIO | Bryron | XXXXX | Class III | Amanda Taboada | May/17/2020 | uLAB | Case Completed | Not Set Yet | Not Set Yet | ↔ × |
| | ☐ May/17/2020 | DIO | Savannah | XXXXX | Crowding | Amanda Taboada | May/17/2020 | uLAB | Case Completed | Not Set Yet | Not Set Yet | ↔ × |
| | ☐ May/17/2020 | DIO | Bryan | XXXXX | Class II | Karen Cubas | May/17/2020 | uLAB | Case Completed | Not Set Yet | Jun/11/2020 | ↔ × |
| | ☐ May/17/2020 | DIO | Carole | XXXXX | Crowding | Stephanie Padilla | May/17/2020 | uLAB | Case Completed | Not Set Yet | Not Set Yet | ↔ × |
| | ☐ May/17/2020 | DIO | Darwin | XXXXX | Spacing | Karen Cubas | May/17/2020 | uLAB | Case Completed | Not Set Yet | Not Set Yet | ↔ × |
| | 1000 Showing 1 to 10 or 29 entries | | | | | | | FIRST PREV ① 2 3 NEXT LAST | | |

FIG. 10

| | | CP DUALINE | | ⊙ Dashboard | | | | | | | | | |
|---|---|---|---|---|---|---|---|---|---|---|---|---|---|
| | ⊙ | Demo | | | | | | | | | ← → Calender View | | |
| ::: | | Dashboard | | | | | | | | | | | |
| ⊙ | Ready For Loading | | 44 | ▦ Due Soon | | | | | | | Search: | | |
| ⌕ | Dr Review | | 11 | Show 10 entries | | | | | | | | | |
| ⎙ | Needs Printing | | 28 | ↕ Date | Patient Location | First Name | Last Name | Treatment Type | Scan By | Scan Date | Software Name | Current Status | Next Status | Due Date | Actions |
| ◁ | Needs Thermoform | | 1 | □ May/ 13/2020 | DIDO | Amanda | XXXXX | Crowding | Maria Paz | May/ 13/2020 | uLAB | Dr Review | Needs Printing | Sep/ 24/2020 | ↔ ↕ ✕ |
| ⎙ | Needs Trim and Polish | | 0 | □ May/ 17/2020 | DIO | Jorge | XXXXX | Crowding | Stephanie Padilla | May/ 17/2020 | uLAB | Needs Printing | Needs Thermoform | Sep/ 21/2020 | ↔ ↕ ✕ |
| ⊘ | Needs Packaging | | 0 | □ May/ 17/2020 | DIO | Maya | XXXXX | Crowding | Karen Cubas | May/ 17/2020 | uLAB | Ready For Loading | Dr Review | Sep/ 30/2020 | ↔ ↕ ✕ |
| ✢ | Case Ready | | 3 | □ May/ 17/2020 | DIDO | Ashley | XXXXX | Class II | Maria Paz | May/ 17/2020 | uLAB | Dr Review | Needs Printing | Sep/ 24/2020 | ↔ ↕ ✕ |
| ⊙ | Case Completed | | 29 | □ May/ 17/2020 | DIO | Natalia | XXXXX | Spacing | Stephanie Padilla | May/ 17/2020 | uLAB | Ready For Loading | Dr Review | Sep/ 22/2020 | ↔ ↕ ✕ |
| ⟳ | Due Soon | | 12 | □ May/ 17/2020 | DIO | Jean | XXXXX | Spacing | Maria Paz | May/ 17/2020 | uLAB | Ready For Loading | Dr Review | Sep/ 21/2020 | ↔ ↕ ✕ |
| | | | | □ Sep/ 08/2020 | DIO | Pedro | XXXXX | Spacing | Maria Paz | Sep/ 08/2020 | uLAB | Dr Review | Needs Printing | Sep/ 22/2020 | ↔ ↕ ✕ |
| | | | | 1100 | | | | | | | | | FIRST PREV ① NEXT LAST |
| | | | | Showing 1 to 7 of 7 entries | | | | | | | | | |

SYSTEMS AND METHODS FOR TRACKING DENTAL ALIGNER PRODUCTION AND MANUFACTURE

FIELD OF THE TECHNOLOGY

The present technology relates generally to dental aligner production. More particularly, and not by limitation, the technology relates to systems and methods for tracking dental aligner production and manufacture for a plurality of patients.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Invisalign® is one of the biggest makers of clear dental aligners to straighten teeth. Recently intellectual property assigned to Invisalign® has expired leaving this field open for competitors to make competing clear dental aligners. Also, three-dimensional (3D) printing has recently become widely available and affordable. Thus, many orthodontists and dentists are joining this field of producing clear dental aligners in-house creating a need for systems for tracking dental aligner production and manufacture.

Existing solutions to track patient data for the status of various steps of dental aligner production include using a spreadsheet program such as Microsoft® Excel® and tracking dental aligner production "by hand" using a white board. These existing solutions are cumbersome, inefficient, and may display information incorrectly and inefficiently. As a result, a user may miss relevant patient data and miss deadlines. Consequently, there is a need for tracking the production and manufacture of clear aligners for a plurality of patients using graphical user interfaces that act as an interactive guide.

SUMMARY OF THE INVENTION

In some embodiments, the present disclosure is directed to a system of one or more computers which can be configured to perform particular operations or actions by virtue of having software, firmware, hardware, or a combination thereof installed on the system that in operation causes or cause the system to perform actions and/or method steps as described herein. For example, embodiments may include a method for tracking dental aligner production and manufacture for a plurality of patients. In some embodiments the method may include: (A) receiving an intra-oral scan including starting teeth positions of a patient; (B) receiving a treatment plan including desired teeth positions of the patient based on the intra-oral scan; (C) generating a series of modified teeth positions from the starting teeth positions based on the treatment plan, the series of modified teeth positions from the starting teeth positions being incremental changes from the starting teeth positions to the desired teeth positions; (D) printing, using a three-dimensional (3D) printer, a series of dental models matching the series of modified teeth positions from the starting teeth positions, the series of dental models being used for fabricating a series of dental aligners that cause the starting teeth positions of the patient to physically change to the desired teeth positions; and (E) displaying a graphical user interface for the tracking dental aligner production and manufacture for the plurality of patients, the graphical user interface for the tracking dental aligner production and manufacture for the plurality of patients comprising: (a) a first row of cells containing a first subject heading displaying a scan status, the scan status being a status of the receiving the intra-oral scan; (b) a second row of cells containing a second subject heading displaying a treatment plan status, the treatment plan status being a status of the receiving a treatment plan including the desired teeth positions of the patient based on the intra-oral scan; and (c) a third row of cells containing a third subject heading displaying a printing status, the printing status being a status of the printing, using the three-dimensional (3D) printer, the series of dental models matching the series of modified teeth positions.

In various embodiments the displaying the graphical user interface for the tracking dental aligner production and manufacture for the plurality of patients further comprises: (d) a fourth row of cells containing a fourth subject heading displaying a thermoform status, the thermoform status being a status of thermoforming a dental aligner of the series of dental aligners matching the series of modified teeth positions.

In various embodiments the displaying the graphical user interface for the tracking dental aligner production and manufacture for the plurality of patients further comprises: (e) a fifth row of cells containing a fifth subject heading displaying a trim and polish status, the trim and polish status being a status of trimming and polishing of the dental aligner of the series of dental aligners matching the series of modified teeth positions.

In various embodiments the displaying the graphical user interface for the tracking dental aligner production and manufacture for the plurality of patients further comprises: (f) a sixth row of cells containing a sixth subject heading displaying a packaging status, the packaging status being a status of packaging of the dental aligner of the series of dental aligners matching the series of modified teeth positions.

In some embodiments the displaying the graphical user interface for the tracking dental aligner production and manufacture for the plurality of patients further comprises: (g) a seventh row of cells containing a seventh subject heading displaying a case ready status, the case ready status being a status of completion of the dental aligner of the series of dental aligners matching the series of modified teeth positions.

In some embodiments the displaying the graphical user interface for the tracking dental aligner production and manufacture for the plurality of patients further comprises: (h) an eight row of cells containing an eighth subject heading displaying a case completed status, the case completed status being a status of completion of all aligners of the series of dental aligners matching the series of modified teeth positions.

In some embodiments further comprising: receiving a focus cell activation from a user, the focus cell activation from the user causing the graphical user interface for the tracking dental aligner production and manufacture for the plurality of patients to display at least one of the scan status, the treatment plan status, and the printing status for the plurality of patients.

In some embodiments the intra-oral scan is received from an intraoral scanner, the intraoral scanner providing the starting teeth positions of the patient.

In various embodiments the present technology is directed to a system for tracking dental aligner production and manufacture for a plurality of patients, the system comprising: (A) an intraoral scanner generating an intra-oral scan including starting teeth positions of a patient; (B) at least one processor; and (C) a memory storing processor-executable instructions, the at least one processor is configured to implement the following operations upon executing the processor-executable instructions: (a) generating a treatment plan including desired teeth positions of the patient based on the intra-oral scan; and (b) generating a series of modified teeth positions from the starting teeth positions based on the treatment plan, the series of modified teeth positions from the starting teeth positions being incremental changes from the starting teeth positions to the desired teeth positions. The system further includes (D) a three-dimensional (3D) printer printing, a series of dental models matching the series of modified teeth positions from the starting teeth positions, the series of dental models being used for fabricating a series of dental aligners that cause the starting teeth positions of the patient to physically change to the desired teeth positions; and (E) a graphical user interface for the tracking dental aligner production and manufacture for the plurality of patients, the graphical user interface displaying: (i) a first row of cells containing a first subject heading displaying a scan status, the scan status being a status of the generating the intra-oral scan; (ii) a second row of cells containing a second subject heading displaying a treatment plan status, the treatment plan status being a status of the generating a treatment plan including the desired teeth positions of the patient based on the intra-oral scan; and (iii) a third row of cells containing a third subject heading displaying a printing status, the printing status being a status of the printing, using the three-dimensional (3D) printer, the series of dental models.

In various embodiments the present technology is directed to non-transitory computer readable medium having embodied thereon instructions being executable by at least one processor to perform operations for tracking dental aligner production and manufacture for a plurality of patients, the operations comprising: (A) receiving an intra-oral scan including starting teeth positions of a patient from an intraoral scanner; (B) receiving a treatment plan including desired teeth positions of the patient based on the intra-oral scan; (C) generating a series of modified teeth positions from the starting teeth positions based on the treatment plan, the series of modified teeth positions from the starting teeth positions being incremental changes from the starting teeth positions to the desired teeth positions; (D) printing, using a three-dimensional (3D) printer, a series of dental models matching the series of modified teeth positions from the starting teeth positions, the series of dental models being used for fabricating a series of dental aligners that cause the starting teeth positions of the patient to physically change to the desired teeth positions; and (E) displaying a graphical user interface for the tracking dental aligner production and manufacture for the plurality of patients, the graphical user interface for the tracking dental aligner production and manufacture for the plurality of patients comprising: (a) a first row of cells containing a first subject heading displaying a scan status, the scan status being a status of the receiving the intra-oral scan; (b) a second row of cells containing a second subject heading displaying a treatment plan status, the treatment plan status being a status of the receiving a treatment plan including the desired teeth positions of the patient based on the intra-oral scan; and (c) a third row of cells containing a third subject heading displaying a printing status, the printing status being a status of the printing, using the three-dimensional (3D) printer, the series of dental models matching the series of modified teeth positions.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

FIG. 3 illustrates a graphical user interface showing a ready for loading status for tracking dental aligner production and manufacture for the plurality of patients after a user selects a subject heading of ready for loading of FIG. 2, in accordance with various embodiments of the present technology.

FIG. 4 illustrates a graphical user interface showing Dr. review status for tracking dental aligner production and manufacture for the plurality of patients after a user selects a subject heading of Dr. review of FIG. 2, in accordance with various embodiments of the present technology.

FIG. 5 illustrates a graphical user interface showing needs printing status for tracking dental aligner production and manufacture for the plurality of patients after a user selects a subject heading of needs printing of FIG. 2, in accordance with various embodiments of the present technology.

FIG. 6 illustrates a graphical user interface showing needs thermoform status for tracking dental aligner production and manufacture for the plurality of patients after a user selects a subject heading of needs thermoform of FIG. 2, in accordance with various embodiments of the present technology.

FIG. 7 illustrates a graphical user interface showing needs trim and polish status for tracking dental aligner production and manufacture for the plurality of patients after a user selects a subject heading needs trim and polish of FIG. 2, in accordance with various embodiments of the present technology.

FIG. 8 illustrates a graphical user interface showing needs packaging status for tracking dental aligner production and manufacture for the plurality of patients after a user selects a subject heading needs packaging of FIG. 2, in accordance with various embodiments of the present technology.

FIG. 9 illustrates a graphical user interface showing case ready status for tracking dental aligner production and manufacture for the plurality of patients after a user selects a subject heading case ready of FIG. 2, in accordance with various embodiments of the present technology.

FIG. 10 illustrates a graphical user interface showing case completed status for tracking dental aligner production and manufacture for the plurality of patients after a user selects a subject heading case completed of FIG. 2, in accordance with various embodiments of the present technology.

FIG. 11 illustrates a graphical user interface showing due soon status for tracking dental aligner production and manufacture for the plurality of patients after a user selects a subject heading due soon of FIG. 2, in accordance with various embodiments of the present technology.

FIG. 13 illustrates a graphical user interface showing an add treatment type for tracking dental aligner production and manufacture for the plurality of patients after a user selects a subject heading add treatment type under settings of FIG. 2, in accordance with various embodiments of the present technology.

FIG. 14 illustrates a graphical user interface showing an add appliance type for tracking dental aligner production and manufacture for the plurality of patients after a user selects an add appliance type under settings of FIG. 2, in accordance with various embodiments of the present technology.

DETAILED DESCRIPTION OF THE EMBODIMENTS

Figure 1:
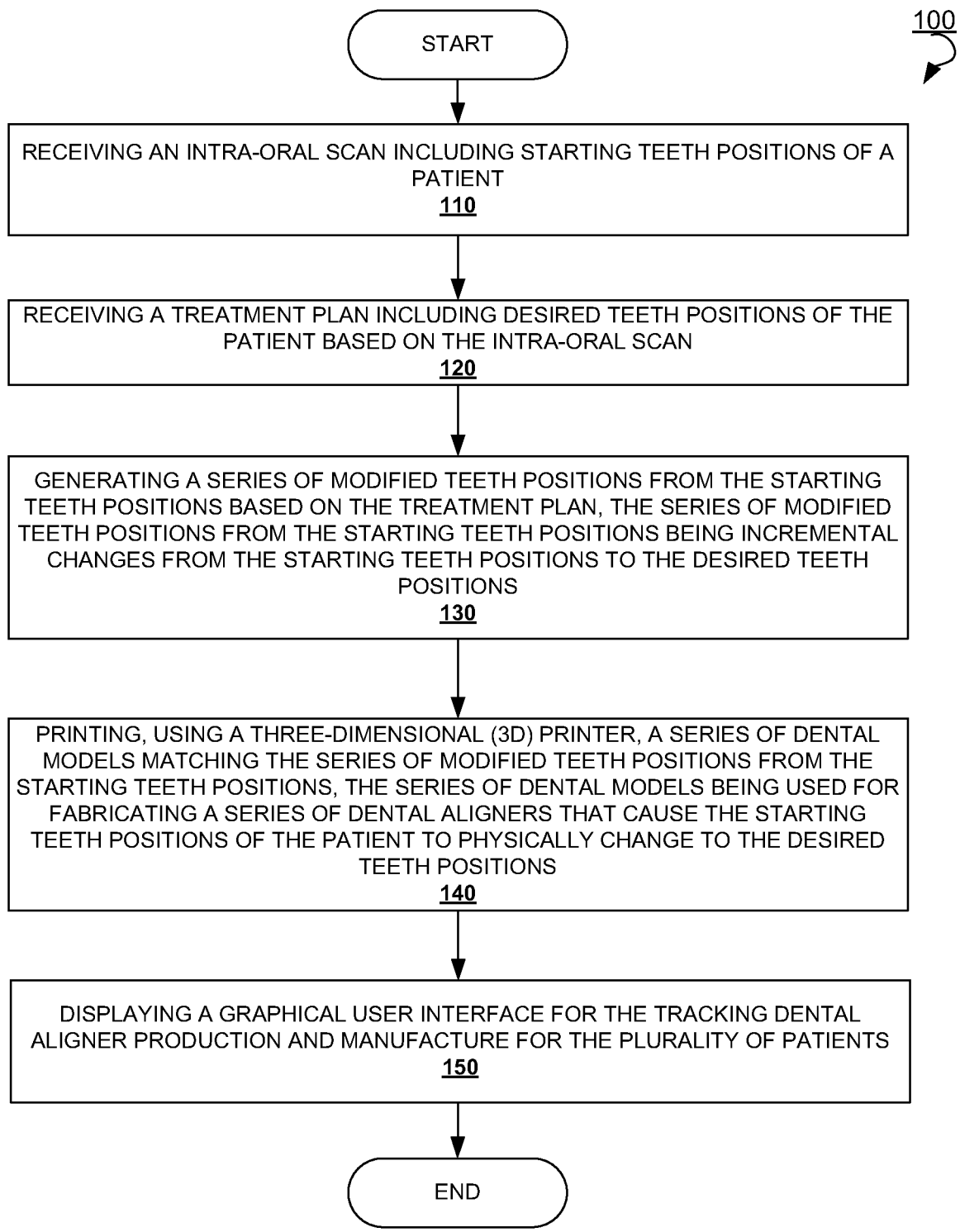
FIG. 1 illustrates process flow diagram showing a method for tracking dental aligner production and manufacture for a plurality of patients, in accordance with various embodiments of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure. It should be understood that the disclosed embodiments are merely exemplary of the invention, which may be embodied in multiple forms. Those details disclosed herein are not to be interpreted in any form as limiting, but as the basis for the claims.

In various embodiments systems and methods of the present technology solve the problem of orthodontists not being able to accurately and in real time track dental aligner production and manufacture for a plurality of patients. Existing solutions lack the functionality of tracking in real time which step in the process of dental aligner production each patient case is for a plurality of patients. Patient case or "case" is a dental record or dental chart including data related to treatment of a patient.

Historically, in dental aligner production and manufacture, an orthodontist only completes the initial set-up for each patient case in-house. Every other step of dental aligner production and manufacture is outsourced outside of the office of the orthodontist. In contrast, when manufacturing dental aligners within the office using embodiments of the present technology, the orthodontist is responsible for every step of dental aligner production and manufacture. Orthodontists do not have a way of tracking dental aligner production and manufacture for a plurality of patients efficiently that results in the dental aligners being ready for patients on time, with continual monitoring, and with real-time status updates. For example, existing solutions include updating whiteboards "by hand" or using a spreadsheet program such as Microsoft® Excel® to track patient data including the status of various steps of dental aligner production. These existing solutions are not efficient and are cumbersome for tracking dental aligner production and manufacture for a plurality of patients. The present technology allows an orthodontist to input information for each patient of a plurality of patients and to update the status of each patient in real time to ensure that all patient cases are accurately tracked and delivered on-schedule. The present technology allows a user to display which patient cases are due soon, and to prioritize patient cases using a graphical user interface. For instance, a snapshot of patient flow.

Various embodiments of the present technology generate a dashboard on a graphical user interface that displays an overview of the total number of patient cases entered in the system and how many patient cases are in each category. For instance, a main dashboard. The present technology may allow a user to filter patient data by geographic location, as necessary. For example, when an orthodontist has offices in different geographic locations a user may filter patient data by geographic location of each office as necessary for each user.

In some embodiments the present technology includes a patient card that allows for a user to view how many dental aligners are needed for patient cases, how many dental aligners need to be made for patient cases, an appointment date for each patient, and any special instructions. Each individual category of the present technology may have various sub-categories that break down the name of each patient, software used, scan date, the team member that scanned the patient, as well as the ability to move an individual patient case or a group of patient cases forward or backward to different categories.

In various embodiments of the present technology a user may add photos, radiographs, and digital models to a patient case. For example, a user may insert one or more photos, add one or more X-rays, and add digital models to a patient case using the present technology. The functionality to add this patient data to a to a patient case allows for all data related to the patient to be organized and easily accessible. For instance, this functionality to add data to a patient case may be particularly useful in an academic setting when a lecturer is discussing the patient case and all the data related to a patient case is easily accessible to the lecturer using the present technology. For example, when all recorded information regarding a patient case including dental history, diagnostic information, clinical notes, and diagnostic scan(s) is available to a lecturer, each patient case is easily discussed. Without this functionality to add data to a patient case, the lecturer is forced to use multiple different programs to access various records for a patient. In contrast, the present technology allows all patient data to be organized and easily accessible to the lecturer.

In some embodiments of the present technology a user may customize a category for a patient case by entering a custom name. Additionally, the present technology allows a user to add or remove categories based on the individual offices. For example, if a dental practice has offices in different geographic locations, a user may display the offices by a selected geographic location.

FIG. 1 illustrates process flow diagram showing a method 100 for tracking dental aligner production and manufacture for a plurality of patients, in accordance with various embodiments of the present technology. The method 100 may be performed by processing logic that may comprise hardware (e.g., dedicated logic, programmable logic, and microcode), software (such as software run on a general-purpose computer system or a dedicated machine), or a combination thereof.

As shown in FIG. 1, the method 100 may commence at operation 110, with receiving an intra-oral scan including starting teeth positions of a patient. The intra-oral scan includes digital impressions that are digital scans of the mouth of a patient to create a map of the teeth and gums of the patient including the starting teeth positions of the patient. The intra-oral scan allows an orthodontist to view the map of the teeth and gums of the patient on a computer screen in a three-dimensional (3D) model, that is more accurate than an X-ray or traditional mold. In some instances, intra-oral scan allows a dentist or an orthodontist to diagnose issues for the teeth of a patient such as overcrowding, gapped teeth, overbites, underbites, crossbites, and open bites, and the like, for a patient. The intra-oral scan may be received from an intraoral scanner, the intraoral scanner providing the starting teeth positions of the patient. Any scanner may be used that can be used to create a map of the teeth and gums of the patient.

At operation 120, the method 100 may proceed with receiving a treatment plan including desired teeth positions of the patient based on the intra-oral scan. For example, the intra-oral scan allows the orthodontist to observe dental issues of the teeth of a patient such as overcrowding, gapped teeth, overbites, underbites, crossbites, and open bites, and the like. Based on the observations of overcrowding, gapped teeth, overbites, underbites, crossbites, and open bites, and the like, of the teeth of the patient, the orthodontist may make a treatment plan. For instance, the treatment plan from an orthodontist to treat a crossbite may start with a series of modified teeth positions from the starting teeth positions to fix the bite issue. Next, the treatment plan from the orthodontist to treat the crossbite may include a series of modified teeth positions to align and expand the width of the dental arches.

At operation 130, the method 100 may include generating a series of modified teeth positions from the starting teeth positions based on the treatment plan, the series of modified teeth positions from the starting teeth positions being incremental changes from the starting teeth positions to the desired teeth positions. For instance, the treatment plan from an orthodontist to treat a crossbite may start with a series of modified teeth positions from the starting teeth positions to fix the bite issue. Next, the treatment plan from the orthodontist to treat the crossbite may include a series of modified teeth positions to align and expand the width of the dental arches.

At operation 140, the method 100 may proceed with printing, using a three-dimensional (3D) printer, a series of dental models matching the series of modified teeth positions from the starting teeth positions, the series of dental models being used for fabricating a series of dental aligners that cause the starting teeth positions of the patient to physically change to the desired teeth positions. For example, the three-dimensional (3D) printer is any 3D printer for additive manufacturing that is used for the construction of a physical dental model from a digital model. Dental aligners are then fabricated from the 3D printed dental models. For instance, the treatment plan from an orthodontist to treat a crossbite may start with a series of modified teeth positions from the starting teeth positions to fix the bite issue. Next, the treatment plan from the orthodontist to treat the crossbite may include a series of modified teeth positions to align and expand the width of the dental arches.

At operation 150, the method 100 may include displaying a graphical user interface for the tracking dental aligner production and manufacture for the plurality of patients. In some embodiments the graphical user interface is a specialized graphical user interface allowing for various displaying of various rows of cells with subject headings for displaying the status of various steps in the process of dental aligner production and manufacture for the tracking dental aligner production and manufacture for the plurality of patients. For example, the specialized graphical user interface may include a focus cell for receiving focus cell activation from the user. For instance, upon activation by the focus cell activation from the user the graphical user interface for the tracking dental aligner production and manufacture for the plurality of patients may display at least one of the status of various steps in the process of dental aligner production and manufacture. For example, displaying the status of at least one of the scan status, the treatment plan status, and the printing status for the plurality of patients.

In various embodiments the graphical user interface for the tracking dental aligner production and manufacture for the plurality of patients may comprise various rows of cells with subject headings displaying the status of various steps in the process of dental aligner production and manufacture as described in FIG. 2 through FIG. 15. For instance, operation 150 of FIG. 1, displaying a graphical user interface for the tracking dental aligner production and manufacture for the plurality of patients. The graphical user interface may comprise various rows of cells with subject headings displaying the status of various steps in the process of dental aligner production and manufacture as described in FIG. 2 through FIG. 15.

Figure 2:
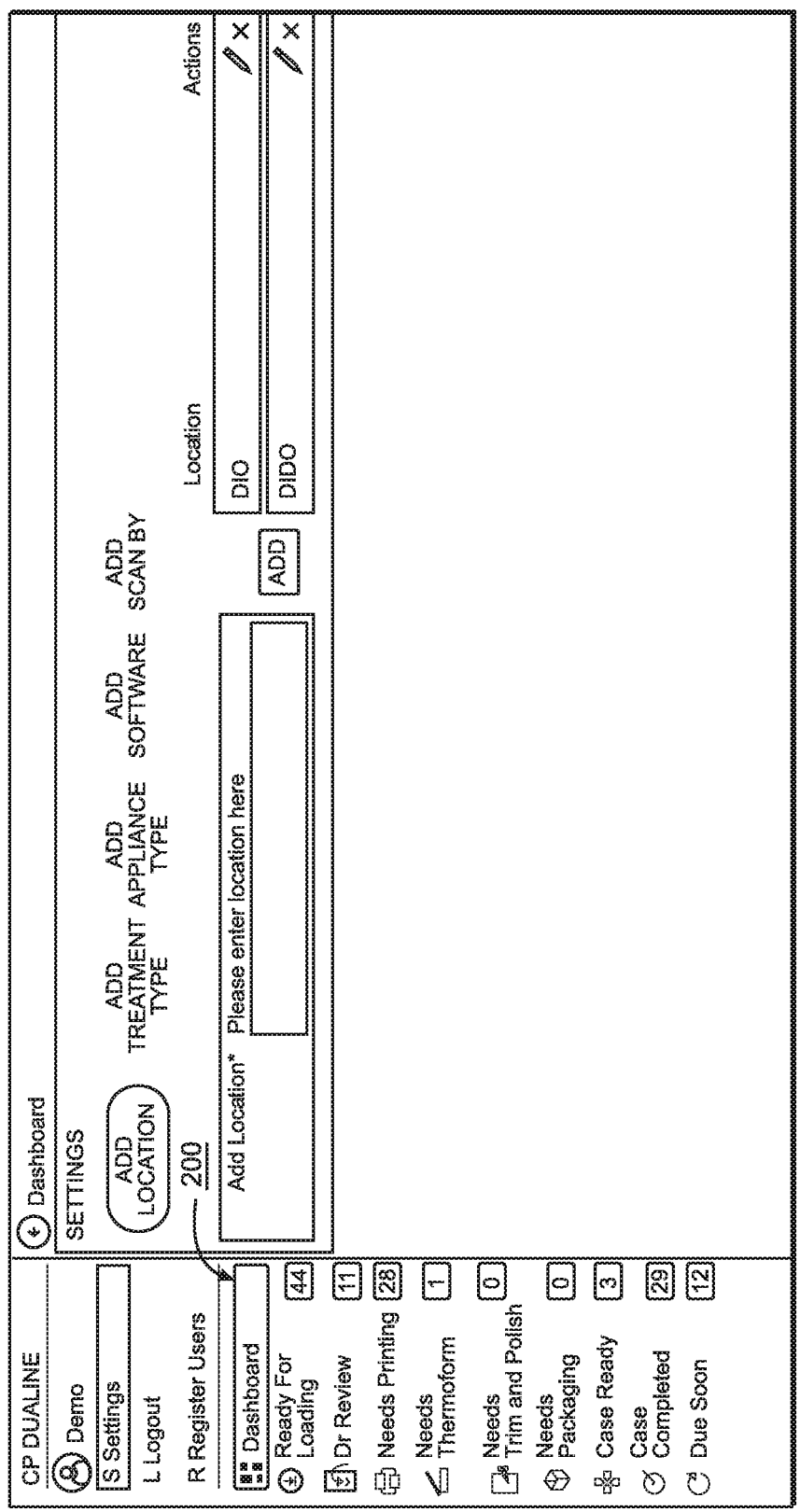
FIG. 2 illustrates a graphical user interface showing a dashboard for tracking dental aligner production and manufacture for the plurality of patients, in accordance with various embodiments of the present technology.

FIG. 2 illustrates a graphical user interface showing a dashboard 200 for tracking dental aligner production and manufacture for a plurality of patients, in accordance with various embodiments of the present technology. The dashboard 200 for tracking dental aligner production and manufacture for the plurality of patients includes various rows of cells with subject headings displaying the status of various steps in the process of dental aligner production and manufacture. For example, the dashboard 200 for tracking dental aligner production and manufacture for a plurality of patients includes various rows of cells with subject headings including a ready for loading status, Dr. review status, needs printing status, needs thermoform status, needs trim and polish status, needs packaging status, case completed status, and due soon status. For example, the various rows of cells with subject headings may include a total number of patients for each status indicator to assist with tracking in real time dental aligner production and manufacture for the plurality of patients.

FIG. 3 illustrates a graphical user interface showing a ready for loading status 300 for tracking dental aligner production and manufacture for the plurality of patients after a user selects the subject heading ready for loading of FIG. 2, in accordance with various embodiments of the present technology. The ready for loading status 300 for tracking dental aligner production and manufacture for the plurality of patients may be displayed after a user selects the subject heading of ready for loading of FIG. 2. For example, the graphical user interface for the tracking dental aligner production and manufacture for the plurality of patients of FIG. 3 displays a first row of cells containing a first subject heading displaying a scan status, the scan status being a status of the receiving the intra-oral scan. For instance, the ready for loading status 300 for tracking dental aligner production and manufacture indicates a status of receiving the intra-oral scan for the plurality of patients as shown in FIG. 3. For instance, a status of operation 110 of FIG. 1, receiving an intra-oral scan including starting teeth positions of a patient for each of the plurality of patients.

FIG. 4 illustrates a graphical user interface showing Dr. review status 400 for tracking dental aligner production and manufacture for the plurality of patients after a user selects a subject heading Dr. review status of FIG. 2, in accordance with various embodiments of the present technology. The Dr. review status 400 for tracking dental aligner production and manufacture for the plurality of patients may be displayed after a user selects the subject heading Dr. review of FIG. 2. For example, the graphical user interface for the tracking dental aligner production and manufacture for the plurality of patients of FIG. 4 displays a second row of cells containing a second subject heading displaying a treatment plan status, the treatment plan status being a status of the receiving a treatment plan including the desired teeth positions of the patient based on the intra-oral scan. For instance, the Dr. review status 400 for tracking dental aligner production and manufacture indicates a status of receiving a treatment plan including the desired teeth positions of the patient based on the intra-oral scan, which are included in the Dr. review for the plurality of patients as shown in FIG. 4. For instance, a status of operation 120 of FIG. 1, receiving a treatment plan including desired teeth positions of the patient based on the intra-oral scan.

FIG. 5 illustrates a graphical user interface showing needs printing status 500 for tracking dental aligner production and manufacture for the plurality of patients after a user selects a subject heading of needs printing of FIG. 2, in accordance with various embodiments of the present technology. The needs printing status 500 for tracking dental aligner production and manufacture for the plurality of patients may be displayed after a user selects the subject heading needs printing of FIG. 2. For example, the graphical user interface for the tracking dental aligner production and manufacture for the plurality of patients of FIG. 5 displays a third row of cells containing a third subject heading displaying a printing status, the printing status being a status of the printing, using the three-dimensional (3D) printer, the series of dental models matching the series of modified teeth positions. For instance, the needs printing status 500 for tracking dental aligner production and manufacture indicates a status of the printing, using the three-dimensional (3D) printer, the series of dental models matching the series of modified teeth positions. For instance, a status of operation 140 of FIG. 1, printing, using a three-dimensional (3D) printer, a series of dental models matching the series of modified teeth positions from the starting teeth positions, the series of dental models being used for fabricating a series of dental aligners that cause the starting teeth positions of the patient to physically change to the desired teeth positions.

Figure 6:
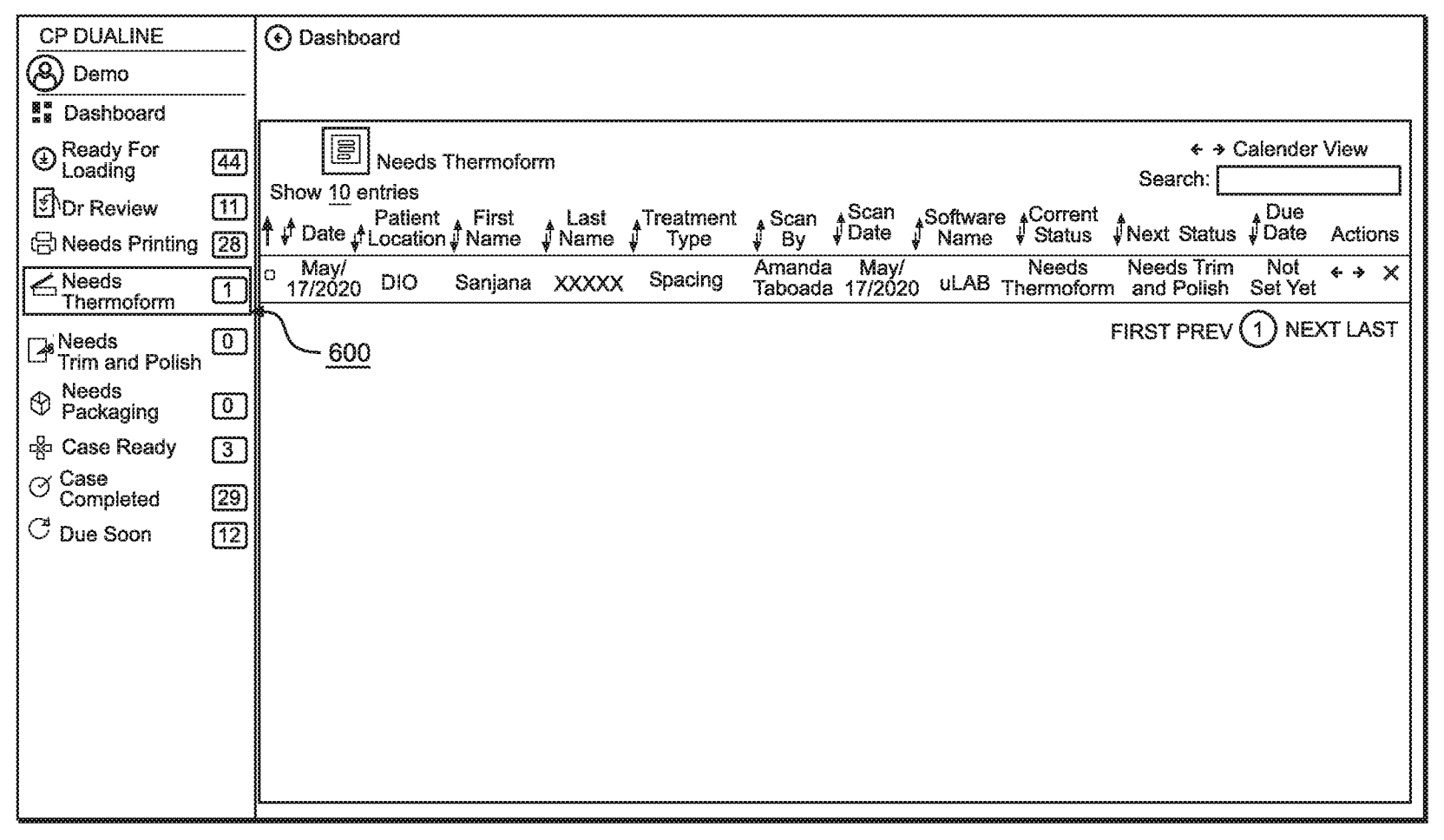

FIG. 6 illustrates a graphical user interface showing needs thermoform status 600 for tracking dental aligner production and manufacture for the plurality of patients after a user selects a subject heading of needs thermoform of FIG. 2, in accordance with various embodiments of the present technology. The needs thermoform status 600 for tracking dental aligner production and manufacture for the plurality of patients may be displayed after a user selects the subject heading of needs thermoform status of FIG. 2. For example, the graphical user interface for the tracking dental aligner production and manufacture for the plurality of patients of FIG. 6 displays a fourth row of cells containing a fourth subject heading displaying a thermoform status, the thermoform status being a status of thermoforming a dental aligner of the series of dental aligners matching the series of modified teeth positions. For instance, the needs thermoform status 600 for tracking dental aligner production and manufacture indicates a status of thermoforming dental aligners for a plurality of patients as shown in FIG. 6.

Figure 7:
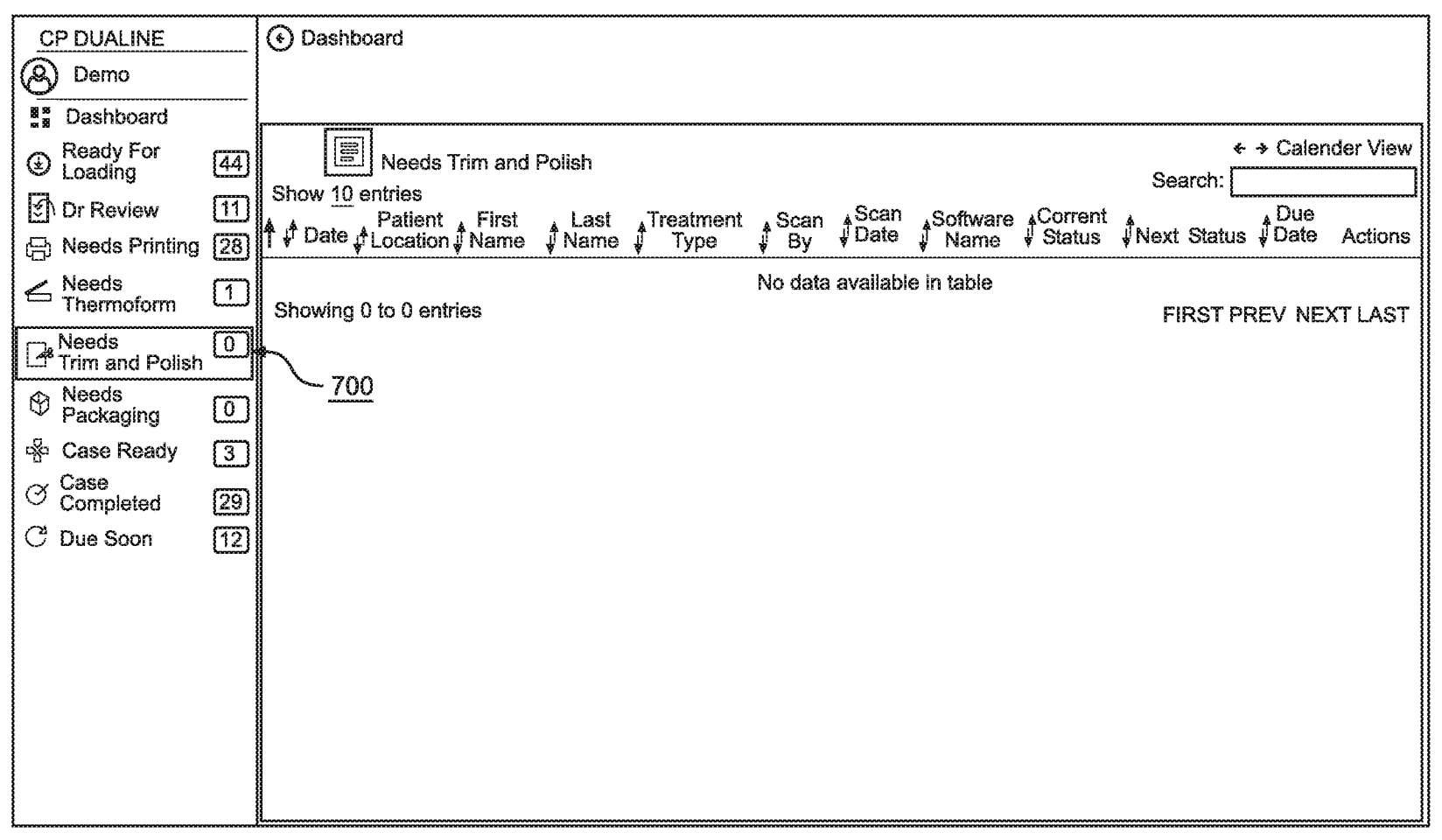

FIG. 7 illustrates a graphical user interface showing needs trim and polish status 700 for tracking dental aligner production and manufacture for the plurality of patients after a user selects a subject heading needs trim and polish of FIG. 2, in accordance with various embodiments of the present technology. The needs trim and polish status 700 for tracking dental aligner production and manufacture for the plurality of patients may be displayed after a user selects the subject heading of needs trim and polish status of FIG. 2. For example, the graphical user interface for the tracking dental aligner production and manufacture for the plurality of patients of FIG. 7 displays a fifth row of cells containing a fifth subject heading displaying a trim and polish status, the trim and polish status being a status of trimming and polishing of the dental aligner of the series of dental aligners matching the series of modified teeth positions. For instance, the needs trim and polish status 700 for tracking dental aligner production and manufacture indicates a status of trimming and polishing of the dental aligner of the series of dental aligners for the plurality of patients as shown in FIG. 7.

Figure 8:
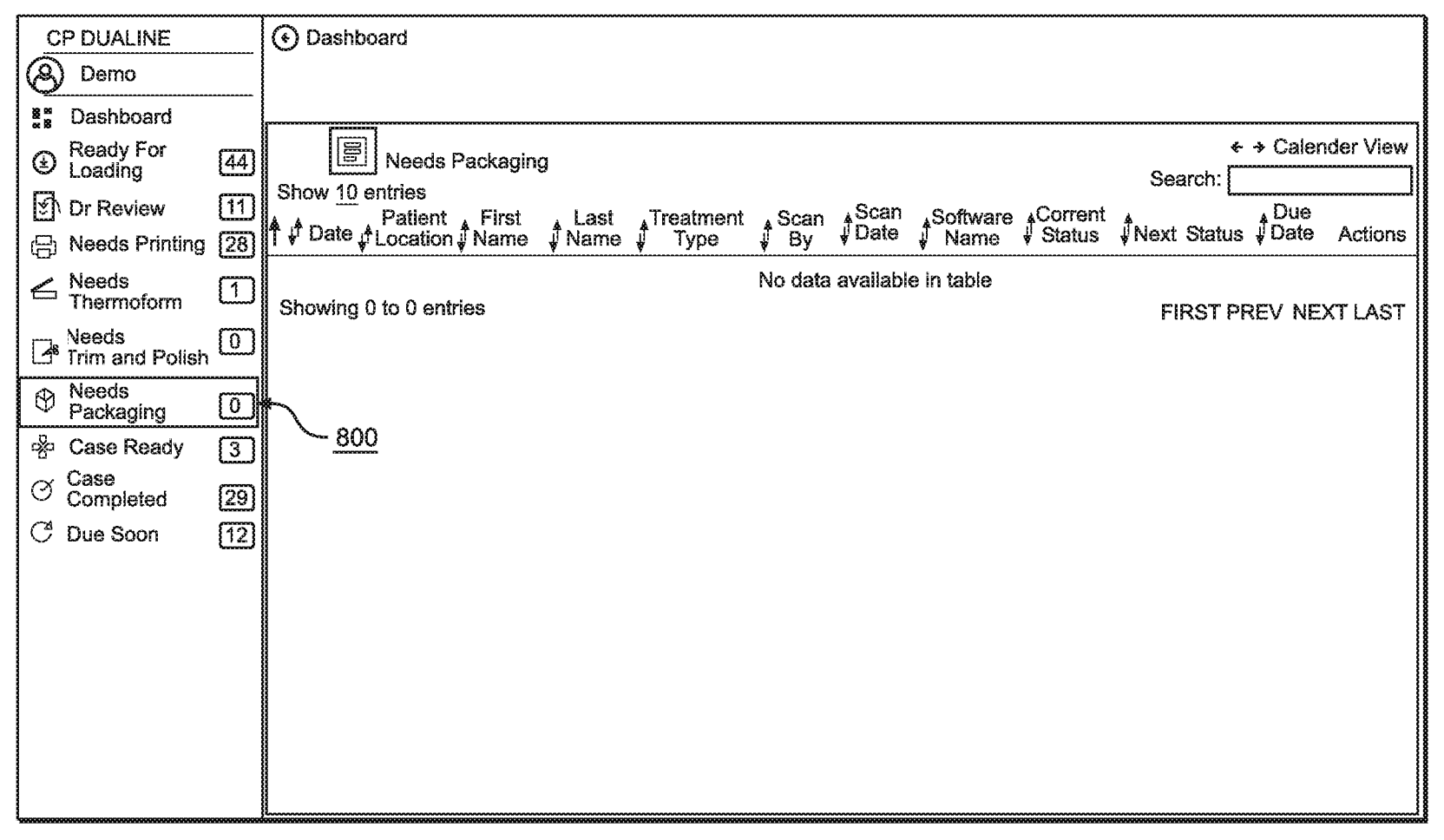

FIG. 8 illustrates a graphical user interface showing needs packaging status 800 for tracking dental aligner production and manufacture for the plurality of patients after a user selects a subject heading needs packaging of FIG. 2, in accordance with various embodiments of the present technology. The needs packaging status 800 for tracking dental aligner production and manufacture for the plurality of patients may be displayed after a user selects the subject heading of needs packaging status of FIG. 2. For example, the graphical user interface for the tracking dental aligner production and manufacture for the plurality of patients of FIG. 8 displays a sixth row of cells containing a sixth subject heading displaying a packaging status, the packaging status being a status of packaging of the dental aligner of the series of dental aligners matching the series of modified teeth positions. For instance, the needs packaging status 800 for tracking dental aligner production and manufacture indicates a status of packaging of the dental aligner of the series of dental aligners matching the series of modified teeth positions as shown in FIG. 8.

FIG. 9 illustrates a graphical user interface showing case ready status 900 for tracking dental aligner production and manufacture for the plurality of patients after a user selects a subject heading case ready of FIG. 2, in accordance with various embodiments of the present technology. The case ready status 900 for tracking dental aligner production and manufacture for the plurality of patients may be displayed after a user selects the subject heading of ready for loading status of FIG. 2. For example, the graphical user interface for the tracking dental aligner production and manufacture for the plurality of patients of FIG. 9 displays a seventh row of cells containing a seventh subject heading displaying a case ready status, the case ready status being a status of completion of the dental aligner of the series of dental aligners matching the series of modified teeth positions. For instance, the case ready status 900 for tracking dental aligner production and manufacture indicates a status of completion of the dental aligner of the series of dental aligners matching the series of modified teeth positions as shown in FIG. 9.

FIG. 10 illustrates a graphical user interface showing case completed status 1000 for tracking dental aligner production and manufacture for the plurality of patients after a user selects a subject heading case completed of FIG. 2, in accordance with various embodiments of the present technology. The case completed status 1000 for tracking dental aligner production and manufacture for the plurality of patients may be displayed after a user selects the subject heading of case completed status of FIG. 2. For example, the graphical user interface for the tracking dental aligner production and manufacture for the plurality of patients of FIG. 10 comprises an eight row of cells containing an eighth subject heading displaying a case completed status, the case completed status being a status of completion of all aligners of the series of dental aligners matching the series of modified teeth positions. For instance, the case completed status 1000 for tracking dental aligner production and manufacture indicates a status of completion of all the steps of dental aligner production and manufacture for the plurality of patients as shown in FIG. 10.

FIG. 11 illustrates a graphical user interface showing due soon status 1100 for tracking dental aligner production and manufacture for the plurality of patients after a user selects a subject heading due soon of FIG. 2, in accordance with various embodiments of the present technology. For instance, the due soon status 1100 for tracking dental aligner production and manufacture indicates any of the steps of dental aligner production and manufacture for the plurality of patients that are due soon as shown in FIG. 11. For example, an orthodontist may be able to avoid missing any due dates for patients by using the due soon status 1100 for tracking dental aligner production and manufacture for the plurality of patients.

Figure 12:
FIG. 12 illustrates a graphical user interface showing a calendar view for tracking dental aligner production and manufacture for the plurality of patients after a user selects a subject heading calendar view of FIG. 11, in accordance with various embodiments of the present technology.

FIG. 12 illustrates a graphical user interface showing a calendar view 1200 for tracking dental aligner production and manufacture for the plurality of patients after a user selects a subject heading calendar view of FIG. 2, in accordance with various embodiments of the present technology. For instance, the calendar view 1200 for tracking dental aligner production and manufacture displays the steps of dental aligner production and manufacture for the plurality of patients on a calendar for easy tracking and also show deadlines that are due soon as shown in FIG. 12. For example, an orthodontist may be able to avoid missing any deadlines for when patients are scheduled to be in the office by using the calendar view 1200 for tracking dental aligner production and manufacture for the plurality of patients.

Figure 13:
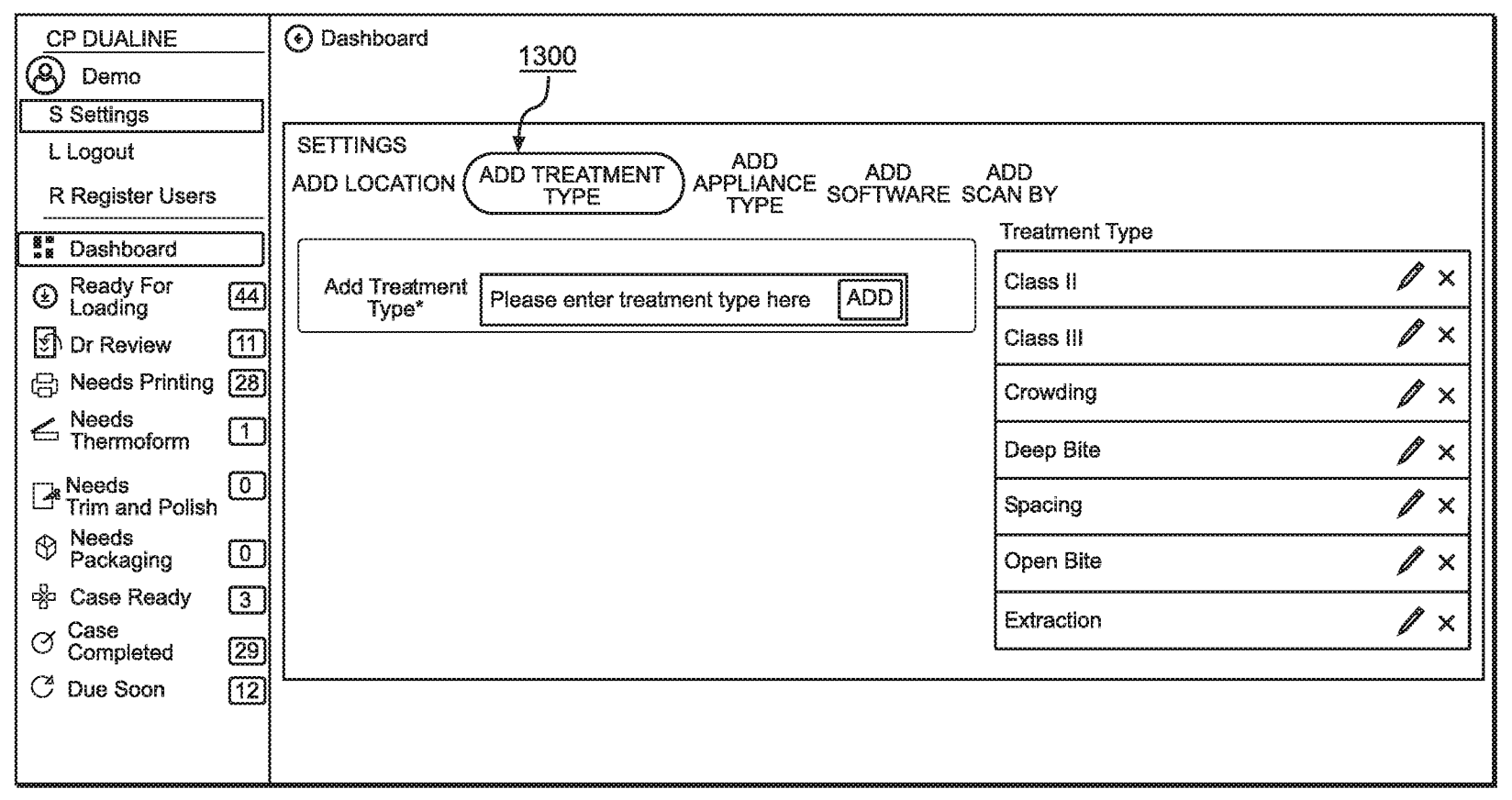

FIG. 13 illustrates a graphical user interface showing an add treatment type 1300 for tracking dental aligner production and manufacture for the plurality of patients after a user selects a subject heading add treatment type under settings of FIG. 2, in accordance with various embodiments of the present technology. For instance, the add treatment type 1300 for tracking dental aligner production and manufacture indicates a data field to add a type of treatment for a patient such as overcrowding, gapped teeth, overbites, underbites, crossbites, and open bites, extraction, and the like. For example, an orthodontist may be able to add a treatment type such as overcrowding, gapped teeth, overbites, underbites, crossbites, and open bites, extraction, and the like, to a patient case for tracking dental aligner production and manufacture for the plurality of patients.

Figure 14:
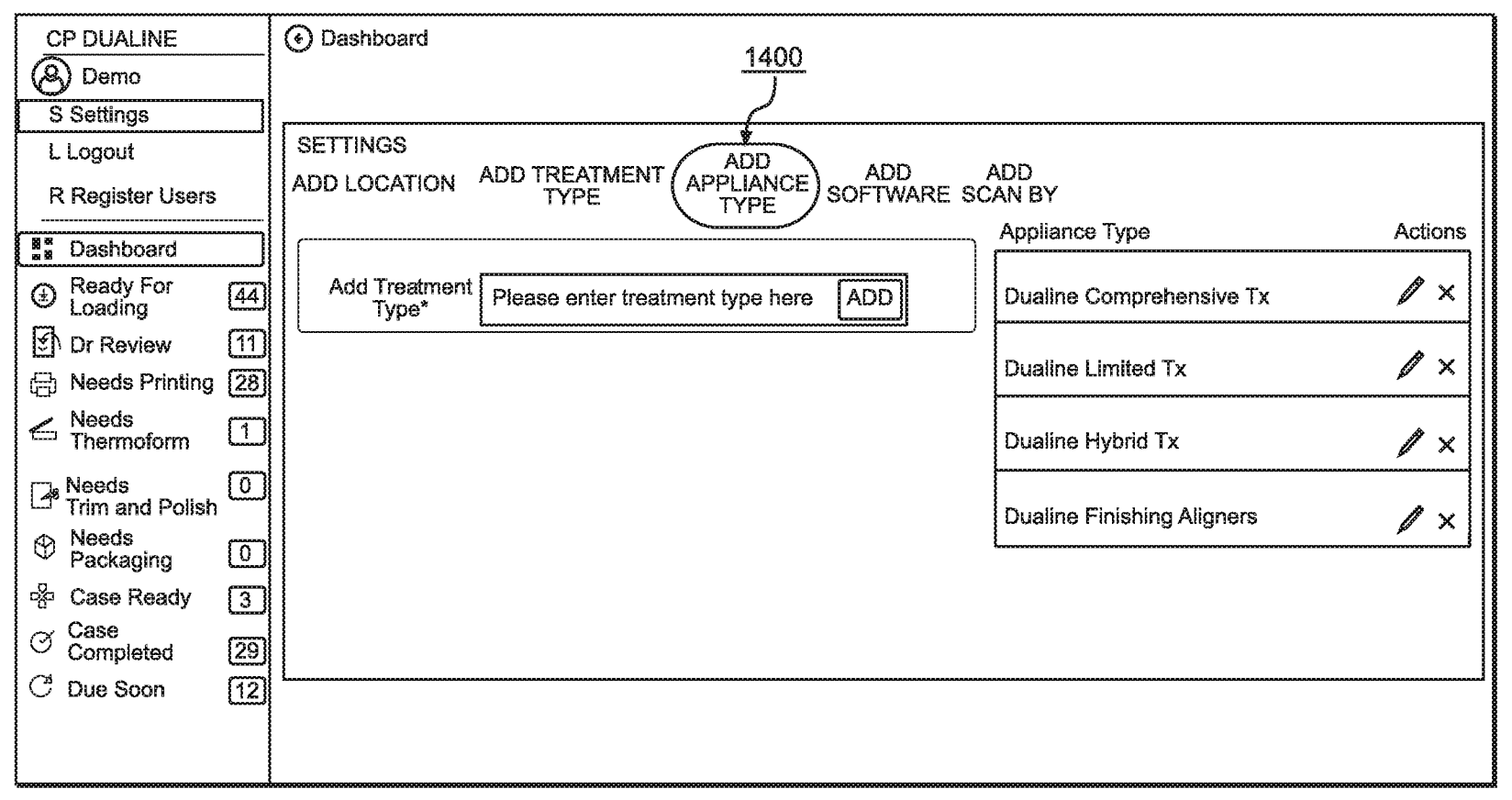

FIG. 14 illustrates a graphical user interface showing an add appliance type 1400 for tracking dental aligner production and manufacture for the plurality of patients after a user selects an add appliance type under settings of FIG. 2, in accordance with various embodiments of the present technology. For instance, the add appliance type 1400 for tracking dental aligner production and manufacture indicates a data field to add appliance type for a patient such as comprehensive, limited, hybrid, and finishing aligners, and the like. For example, an orthodontist may be able to add an appliance type to a patient record type such comprehensive, limited, hybrid, and finishing aligners, and the like, for tracking dental aligner production and manufacture for the plurality of patients.

Figure 15:
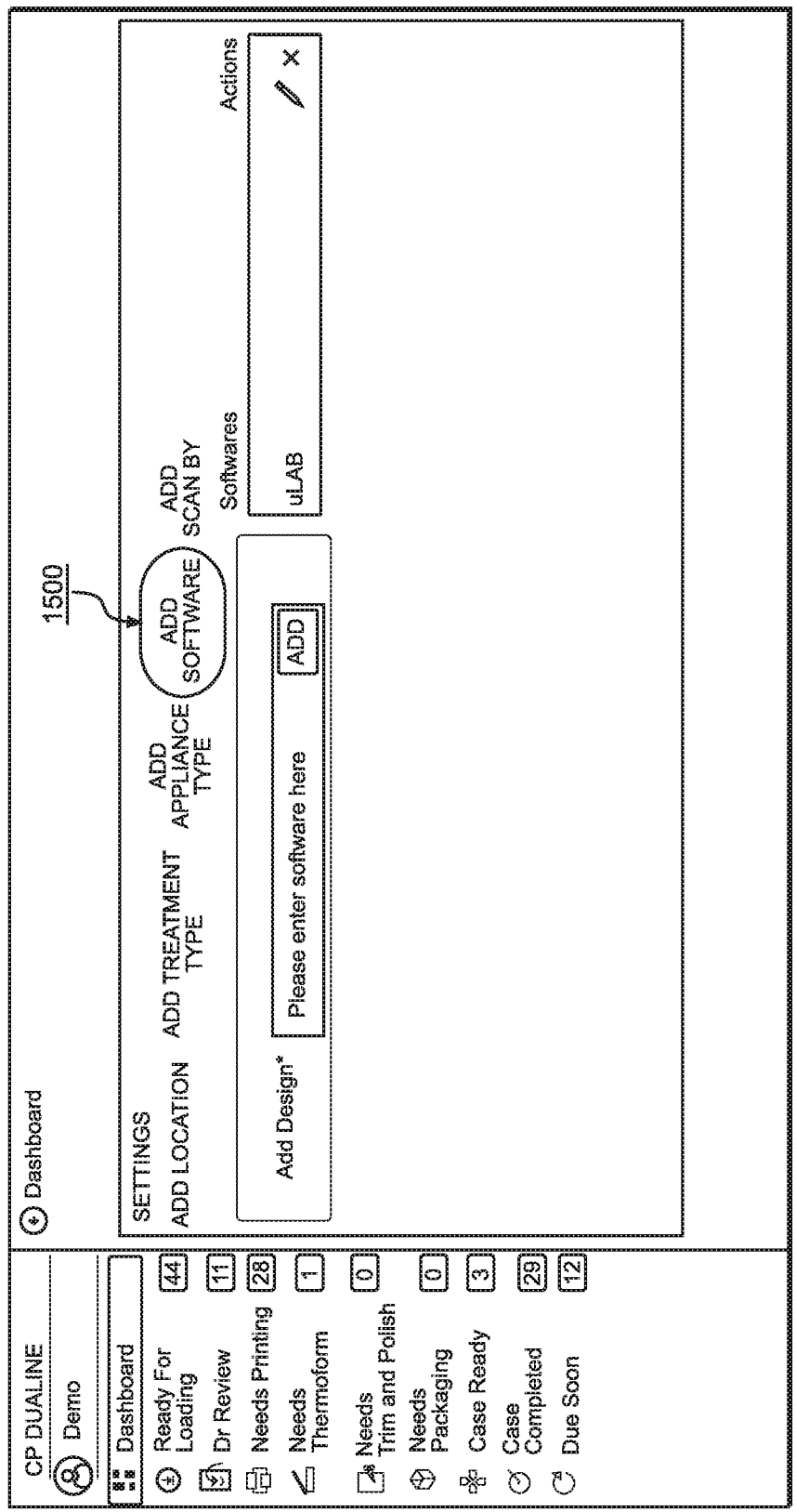
FIG. 15 illustrates a graphical user interface showing an add software for tracking dental aligner production and manufacture for the plurality of patients after a user selects add software under settings of FIG. 2, in accordance with various embodiments of the present technology.

FIG. 15 illustrates a graphical user interface showing an add software 1500 for tracking dental aligner production and manufacture for the plurality of patients after a user selects add software under settings of FIG. 2, in accordance with various embodiments of the present technology. For instance, the add software 1500 for tracking dental aligner production and manufacture indicates a data field to add a type of software used with the tracking dental aligner production and manufacture.

Figure 16:
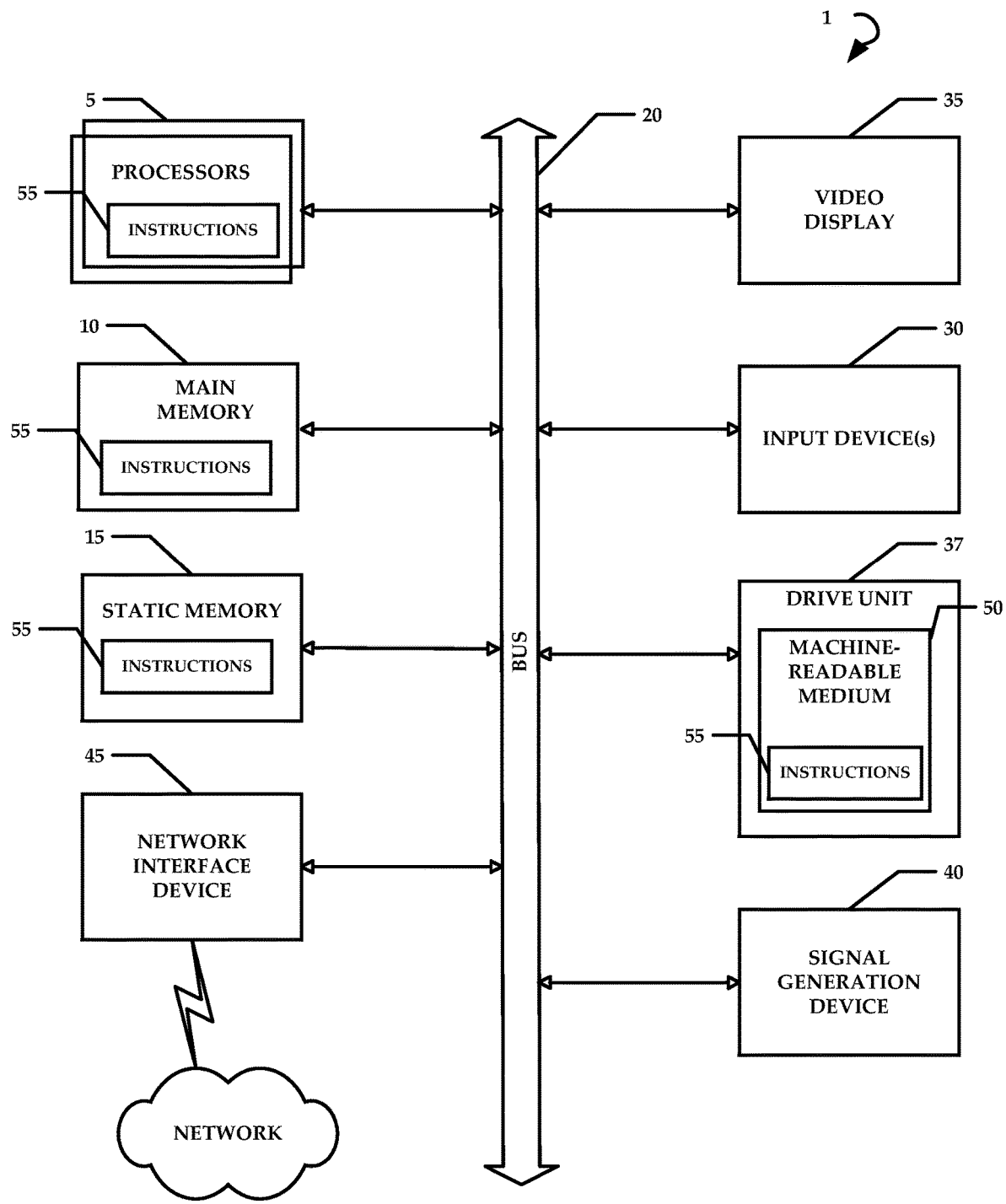
FIG. 16 illustrates an exemplary computer system that may be used to implement embodiments of the present technology according to various embodiments.

FIG. 16 illustrates an exemplary computer system that may be used to implement embodiments of the present technology according to various embodiments. FIG. 16 illustrates a computer system for implementing embodiments according to exemplary embodiments of the present technology. FIG. 16 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the description, for purposes of explanation and not limitation, specific details are set forth, such as particular embodiments, procedures, techniques, and so forth, in order to provide a thorough understanding of the present technology. However, it will be apparent to one skilled in the art that the present technology may be practiced in other embodiments that depart from these specific details.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

While various embodiments have been described above, it should be understood that they have been presented by way of example only, and not limitation. The descriptions are not intended to limit the scope of the present technology to the particular forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A method for chronologically tracking dental aligner production and manufacture for a plurality of patients, the method comprising:
    receiving an intra-oral scan including starting teeth positions of a patient and a date of the intra-oral scan;
    receiving a treatment plan including desired teeth positions of the patient based on the intra-oral scan;
    generating a series of modified teeth positions from the starting teeth positions based on the treatment plan, the series of modified teeth positions from the starting teeth positions being incremental changes from the starting teeth positions to the desired teeth positions;
    printing, using a three-dimensional (3D) printer, a series of dental models matching the series of modified teeth positions from the starting teeth positions, the series of dental models being used to fabricate a series of dental aligners that cause the starting teeth positions of the patient to physically change to the desired teeth positions; and
    displaying a graphical user interface for the chronologically tracking dental aligner production and manufacture for the plurality of patients, the graphical user interface for the chronologically tracking dental aligner production and manufacture for the plurality of patients comprising:
    a first row of cells containing a first subject heading displaying a scan status, the scan status being a status of the receiving the intra-oral scan;
    a second row of cells containing a second subject heading displaying a treatment plan status, the treatment plan status being a status of the receiving a treatment plan including the desired teeth positions of the patient based on the intra-oral scan; and
    a third row of cells containing a third subject heading displaying a printing status, the printing status being a status of the printing, using the three-dimensional (3D) printer, the series of dental models matching the series of modified teeth positions.

2. The method of claim 1, wherein the displaying the graphical user interface for the chronologically tracking dental aligner production and manufacture for the plurality of patients further comprises:
    a fourth row of cells containing a fourth subject heading displaying a thermoform status, the thermoform status being a status of thermoforming a dental aligner of the series of dental aligners matching the series of modified teeth positions.

3. The method of claim 2, wherein the displaying the graphical user interface for the chronologically tracking dental aligner production and manufacture for the plurality of patients further comprises:
 a fifth row of cells containing a fifth subject heading displaying a trim and polish status, the trim and polish status being a status of trimming and polishing of the dental aligner of the series of dental aligners matching the series of modified teeth positions.

4. The method of claim 3, wherein the displaying the graphical user interface for the chronologically tracking dental aligner production and manufacture for the plurality of patients further comprises:
 a sixth row of cells containing a sixth subject heading displaying a packaging status, the packaging status being a status of packaging of the dental aligner of the series of dental aligners matching the series of modified teeth positions.

5. The method of claim 4, wherein the displaying the graphical user interface for the chronologically tracking dental aligner production and manufacture for the plurality of patients further comprises:
 a seventh row of cells containing a seventh subject heading displaying a case ready status, the case ready status being a status of completion of the dental aligner of the series of dental aligners matching the series of modified teeth positions.

6. The method of claim 5, wherein the displaying the graphical user interface for the chronologically tracking dental aligner production and manufacture for the plurality of patients further comprises:
 an eighth row of cells containing an eighth subject heading displaying a case completed status, the case completed status being a status of completion of all aligners of the series of dental aligners matching the series of modified teeth positions.

7. The method of claim 1, further comprising:
 receiving a focus cell activation from a user, the focus cell activation from the user causing the graphical user interface for the chronologically tracking dental aligner production and manufacture for the plurality of patients to display at least one of the scan status, the treatment plan status, and the printing status for the plurality of patients.

8. The method of claim 1, wherein the intra-oral scan is received from an intraoral scanner, the scanner providing the starting teeth positions of the patient.

9. A system for chronologically tracking dental aligner production and manufacture for a plurality of patients, the system comprising:
 an intraoral scanner generating an intra-oral scan including starting teeth positions of a patient and a date of the intra-oral scan;
 at least one processor; and
 a memory storing processor-executable instructions, wherein the at least one processor is configured to implement the following operations upon executing the processor-executable instructions:
  generating a treatment plan including desired teeth positions of the patient based on the intra-oral scan; and
  generating a series of modified teeth positions from the starting teeth positions based on the treatment plan, the series of modified teeth positions from the starting teeth positions being incremental changes from the starting teeth positions to the desired teeth positions;
 a three-dimensional (3D) printer printing a series of dental models matching the series of modified teeth positions from the starting teeth positions, the series of dental models being used to fabricate a series of dental aligners that cause the starting teeth positions of the patient to physically change to the desired teeth positions; and
 a graphical user interface for the chronologically tracking dental aligner production and manufacture for the plurality of patients, the graphical user interface displaying:
  a first row of cells containing a first subject heading displaying a scan status, the scan status being a status of the generating the intra-oral scan;
  a second row of cells containing a second subject heading displaying a treatment plan status, the treatment plan status being a status of the generating a treatment plan including the desired teeth positions of the patient based on the intra-oral scan; and
  a third row of cells containing a third subject heading displaying a printing status, the printing status being a status of the printing, using the three-dimensional (3D) printer, the series of dental models.

10. The system of claim 9, wherein the graphical user interface for the chronologically tracking dental aligner production and manufacture for the plurality of patients further displays:
 a fourth row of cells containing a fourth subject heading displaying a thermoform status, the thermoform status being a status of thermoforming a dental aligner of the series of dental aligners matching the series of modified teeth positions.

11. The system of claim 10, wherein the graphical user interface for the chronologically tracking dental aligner production and manufacture for the plurality of patients further displays:
 a fifth row of cells containing a fifth subject heading displaying a trim and polish status, the trim and polish status being a status of trimming and polishing of the dental aligner of the series of dental aligners matching the series of modified teeth positions.

12. The system of claim 11, wherein the graphical user interface for the chronologically tracking dental aligner production and manufacture for the plurality of patients further displays:
 a sixth row of cells containing a sixth subject heading displaying a packaging status, the packaging status being a status of packaging of the dental aligner of the series of dental aligners matching the series of modified teeth positions.

13. The system of claim 12, wherein the graphical user interface for the chronologically tracking dental aligner production and manufacture for the plurality of patients further displays:
 a seventh row of cells containing a seventh subject heading displaying a case ready status, the case ready status being a status of completion of the dental aligner of the series of dental aligners matching the series of modified teeth positions.

14. The system of claim 13, wherein the graphical user interface for the chronologically tracking dental aligner production and manufacture for the plurality of patients further displays:
 an eighth row of cells containing an eighth subject heading displaying a case completed status, the case completed status being a status of completion of all aligners of the series of dental aligners matching the series of modified teeth positions.

15. The system of claim 9, wherein the at least one processor is further configured to implement the following operations upon executing the processor-executable instructions:

receiving a focus cell activation from a user, the focus cell activation from the user causing the graphical user interface for the chronologically tracking dental aligner production and manufacture for the plurality of patients to further display at least one of the scan status, the treatment plan status, and the printing status for the plurality of patients.

16. A non-transitory computer readable medium having embodied thereon instructions being executable by at least one processor to perform operations for chronologically tracking dental aligner production and manufacture for a plurality of patients, the operations comprising:

receiving an intra-oral scan including starting teeth positions of a patient and a date of the intra-oral scan from an intraoral scanner;

receiving a treatment plan including desired teeth positions of the patient based on the intra-oral scan;

generating a series of modified teeth positions from the starting teeth positions based on the treatment plan, the series of modified teeth positions from the starting teeth positions being incremental changes from the starting teeth positions to the desired teeth positions;

printing, using a three-dimensional (3D) printer, a series of dental models matching the series of modified teeth positions from the starting teeth positions, the series of dental models being used for making a series of dental aligners that cause the starting teeth positions of the patient to physically change to the desired teeth positions; and displaying a graphical user interface for the chronologically tracking dental aligner production and manufacture for the plurality of patients, the graphical user interface for the chronologically tracking dental aligner production and manufacture for the plurality of patients comprising:

a first row of cells containing a first subject heading displaying a scan status, the scan status being a status of the receiving the intra-oral scan;

a second row of cells containing a second subject heading displaying a treatment plan status, the treatment plan status being a status of the receiving a treatment plan including the desired teeth positions of the patient based on the intra-oral scan; and a third row of cells containing a third subject heading displaying a printing status, the printing status being a status of the printing, using the three-dimensional (3D) printer, the series of dental models matching the series of modified teeth positions.

17. The non-transitory computer readable medium of claim 16, wherein the graphical user interface for the chronologically tracking dental aligner production and manufacture for the plurality of patients further comprises:

a fourth row of cells containing a fourth subject heading displaying a thermoform status, the thermoform status being a status of thermoforming a dental aligner of the series of dental aligners matching the series of modified teeth positions.

18. The non-transitory computer readable medium of claim 17, wherein the graphical user interface for the chronologically tracking dental aligner production and manufacture for the plurality of patients further comprises:

a fifth row of cells containing a fifth subject heading displaying a trim and polish status, the trim and polish status being a status of trimming and polishing of the dental aligner of the series of dental aligners matching the series of modified teeth positions.

19. The non-transitory computer readable medium of claim 18, wherein the graphical user interface for the chronologically tracking dental aligner production and manufacture for the plurality of patients further comprises:

a sixth row of cells containing a sixth subject heading displaying a packaging status, the packaging status being a status of packaging of the dental aligner of the series of dental aligners matching the series of modified teeth positions.

20. The non-transitory computer readable medium of claim 19, wherein the graphical user interface for the chronologically tracking dental aligner production and manufacture for the plurality of patients further comprises:

a seventh row of cells containing a seventh subject heading displaying a case ready status, the case ready status being a status of completion of the dental aligner of the series of dental aligners matching the series of modified teeth positions.

21. The non-transitory computer readable medium of claim 20, wherein the graphical user interface for the chronologically tracking dental aligner production and manufacture for the plurality of patients further comprises:

an eighth row of cells containing an eighth subject heading displaying a case completed status, the case completed status being a status of completion of all aligners of the series of dental aligners matching the series of modified teeth positions.

* * * * *